(12) United States Patent
Wen et al.

(10) Patent No.: US 7,839,568 B2
(45) Date of Patent: Nov. 23, 2010

(54) BI-STABLE PROJECTION SCREEN

(75) Inventors: Chun-Hsiang Wen, Hsinchu (TW);
Wen-Hsien Wang, Jiali Township,
Tainan County (TW); Yaw-Ting Wu,
Pingjhen (TW); Hui-Lung Kuo, Taipei
(TW)

(73) Assignee: Industrial Technology Research Institute, Hsinchu (TW)

( * ) Notice: Subject to any disclaimer, the term of this patent is extended or adjusted under 35 U.S.C. 154(b) by 308 days.

(21) Appl. No.: 12/078,119

(22) Filed: Mar. 27, 2008

(65) Prior Publication Data

US 2009/0168143 A1 Jul. 2, 2009

(30) Foreign Application Priority Data

Dec. 31, 2007 (TW) .............................. 96151653 A (51) Int. Cl.
*G03B 21/56* (2006.01)
*G03B 21/60* (2006.01)
(52) U.S. Cl. ...................... 359/443; 359/452; 359/453; 359/460
(58) Field of Classification Search ......... 359/452–453, 359/460, 449, 443; 349/16, 56, 112
See application file for complete search history.

(56) References Cited

U.S. PATENT DOCUMENTS

| 5,416,617 | A | * | 5/1995 | Loiseaux et al. ............... 349/1 |
| 6,147,801 | A | * | 11/2000 | Goldenberg et al. ........ 359/456 |
| 6,483,643 | B1 | * | 11/2002 | Zuchowski .................. 359/443 |
| 6,726,335 | B2 | * | 4/2004 | Yaniv et al. ................... 353/98 |
| 6,943,947 | B2 | * | 9/2005 | Adachi et al. ............... 359/453 |
| 2002/0093607 | A1 | * | 7/2002 | Van De Ven et al. ........ 349/112 |
| 2008/0158449 | A1 | * | 7/2008 | Daverman et al. ............ 349/33 |

* cited by examiner

*Primary Examiner*—Christopher Mahoney
(74) *Attorney, Agent, or Firm*—Rabin & Berdo, P.C.

(57) ABSTRACT

A bi-stable projection screen includes a light diffusion unit and a bi-stable display unit stacked together. The bi-stable display unit, when actuated, selectively operates in a first mode or a second mode. When operating in the first mode (e.g., a transmission mode or a reflection mode), the bi-stable display unit receives a projection light from a front projection or a rear projection, and emits the projection light after modulation. When operating in the second mode (a non-transmission mode or a non-reflection mode), the bi-stable display unit is a pattern to become a part of a scene. The light diffusion unit receives and diffuses the modulated projection light to be perceived by human eyes.

10 Claims, 12 Drawing Sheets

BI-STABLE PROJECTION SCREEN

CROSS-REFERENCE TO RELATED APPLICATIONS

This non-provisional application claims priority under 35 U.S.C. §119(a) on Patent Application No(s). 096151653 filed in Taiwan, R.O.C. on Dec. 31, 2007, the entire contents of which are hereby incorporated by reference.

BACKGROUND OF THE INVENTION

1. Field of Invention

The present invention relates to a bi-stable projection screen, and more particular, relates to a bi-stable projection screen integrating a light diffusion element and a bi-stable display element, and capable of displaying a pattern in addition to be used in projection imaging.

2. Related Art

A projection screen is mainly divided into two types, namely a reflective projection screen and a transmissive projection screen. A projection screen of the reflective projection screen may reflect a projection light and enable the reflected light to produce a light diffusion. A main light path thereof is defined by an image projected onto the projection screen by a projector, and then reflected and diffused into eyes of viewers. This type of projection screen mainly includes two kinds, namely an ordinary screen and a glass beaded screen. The ordinary screen is fabricated by spraying a white paint on a special substrate and then performing a simple process. The ordinary screen is mainly advantageous in a cheap price, wide viewing angle, and soft image color, but has lower reflected brightness and is not easy to exhibit an image with higher definition. Thus, the ordinary screen is usually used in small and medium places. The glass beaded screen is fabricated by uniformly spraying micro glass beads on a special substrate, and thus has advantages of a wide viewing angle and a high brightness. Such a reflective projection screen is used in an orthographic projection (front projection) situation, mainly in cinemas, conference rooms, meeting halls, living rooms, and so on. The front projection screen generally has a larger area and a single tone, typically white or light gray.

The aforementioned transmissive projection screen makes a light projected by a projector to pass through and be diffused. A main light path thereof is defined by an image projected on the projection screen by the projector, and then diffused and transmitted into eyes of the viewers. The main applications of the transmissive projection screen include rear projection TVs, display screens in conference rooms, bulletin boards in shopping malls, and so on. The aforementioned two screens may achieve the projection light diffusion effect on the screens in use, but they would produce an inharmonious visual feeling with the surrounding environment when not used. The front projection screen is usually a flexible screen and can be furled. The rear projection screen is usually a rigid screen and is hard to be packed, so it is more inharmonious with the overall interior design.

SUMMARY OF THE INVENTION

Accordingly, the present invention provides a bi-stable projection screen. Under a proper control, this bi-stable projection screen may operate between two modes. One mode is used to project a projection light from a front projection or a rear projection, i.e., used as a projection screen for a user. When the user does not use the bi-stable projection screen of the present invention as the projection screen, the present invention may be set in the other mode. Under this mode, the users can input a pattern to be displayed, and thus the pattern can be combined with an interior background to become a part of the interior design, thereby solving the problems of the related arts.

The bi-stable projection screen of the present invention includes a light diffusion unit and a bi-stable display unit. The bi-stable display unit, when actuated, selectively operates in a first mode or a second mode. When operating in the first mode, the bi-stable display unit receives a projection light and emits the projection light after modulation. When operating in the second mode, the bi-stable display unit is a pattern. The light diffusion unit receives and diffuses the modulated projection light and then emits it.

Therefore, the present invention has the effect that the bi-stable display unit can project the projection light when operating in the first mode, or become a part of the interior design when operating in the second mode, thereby solving the problems of the related arts.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
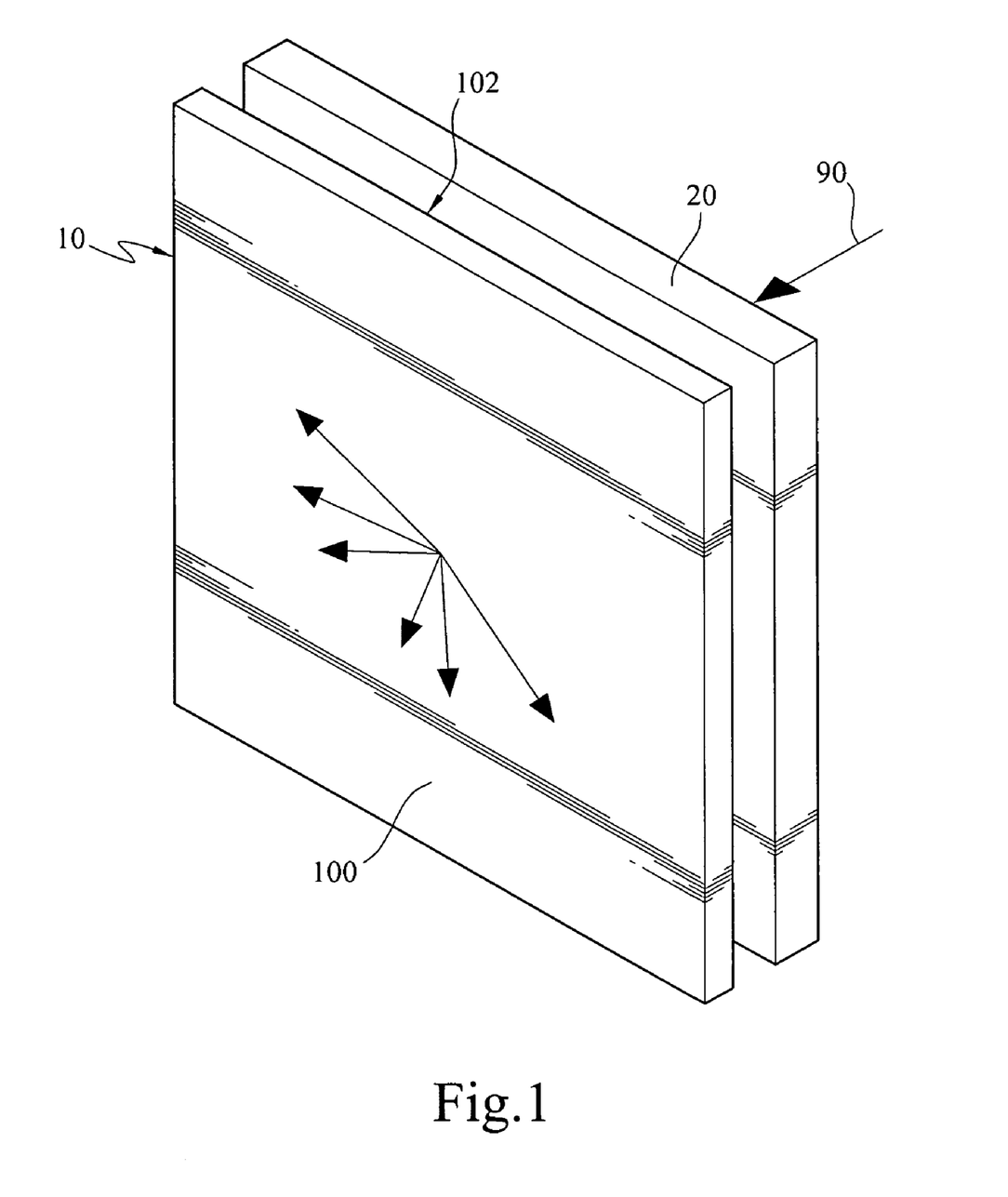
FIG. 1 is a schematic view of a first embodiment of the present invention.

FIG. 1 is a schematic view of a first embodiment of the present invention. Referring to FIG. 1, the bi-stable projection screen of the present invention includes a light diffusion unit 10 and a bi-stable display unit 20. The bi-stable display unit 20, when actuated, selectively operates in a first mode or a second mode. When operating in the first mode, the bi-stable display unit 20 receives a projection light 90 and emits the projection light 90 after modulation. When operating in the second mode, the bi-stable display unit 20 is a pattern. The light diffusion unit 10 receives and diffuses the modulated projection light 90 and then emits it.

Figure 2A:
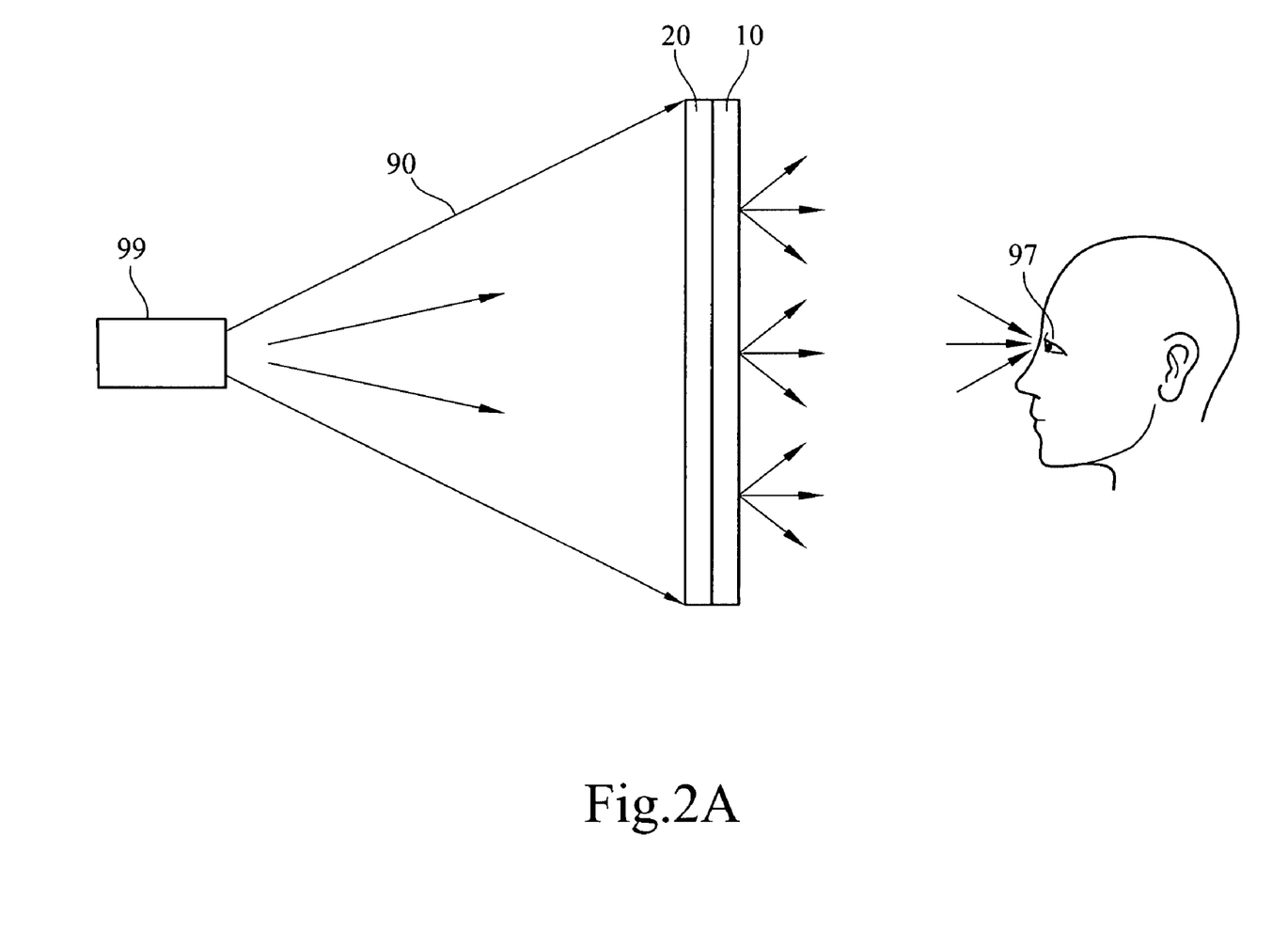
FIG. 2A is a schematic view of the present invention operating in a first mode and applied in a rear projection situation.
Figure 2B:
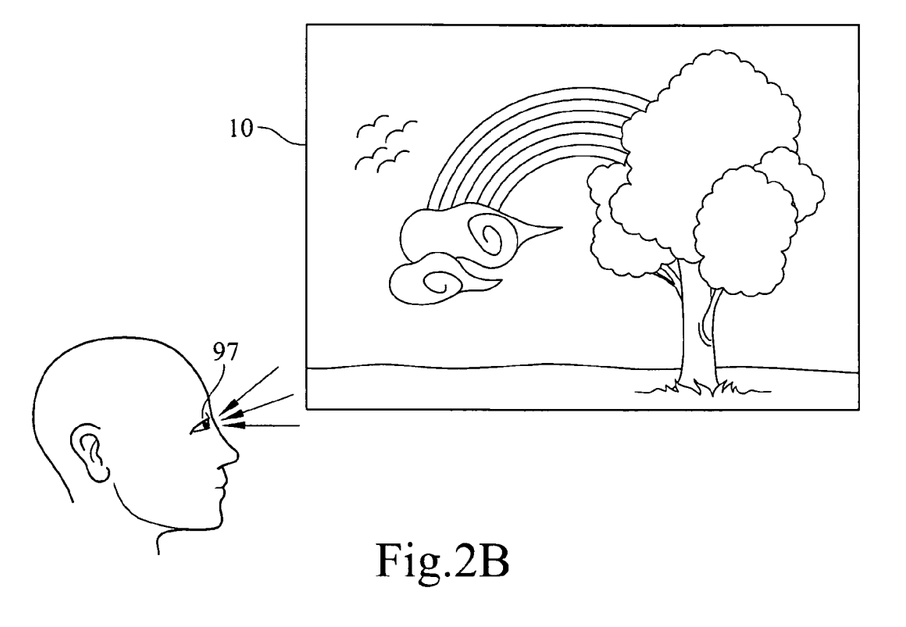
FIG. 2B is a schematic view of the present invention operating in a second mode.
Figure 2C:
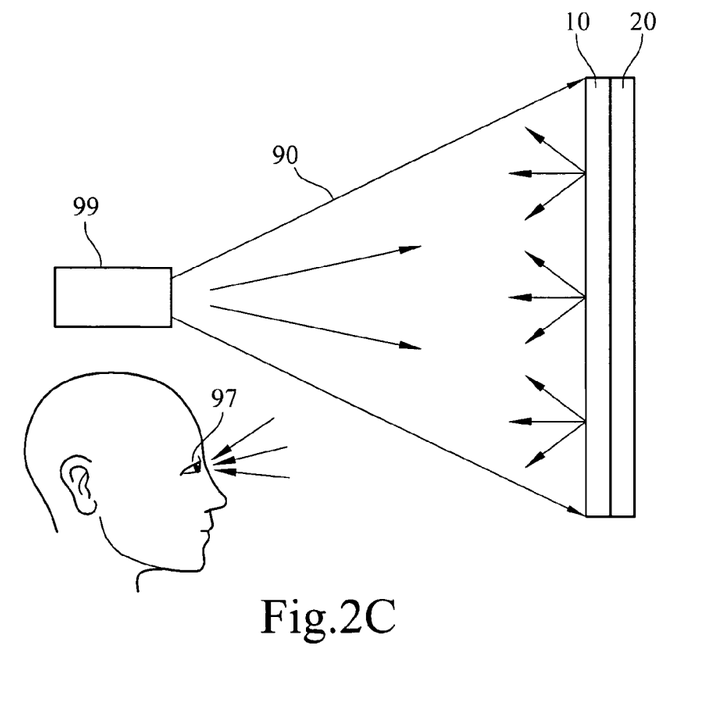
FIG. 2C is a schematic view of the present invention operating in the first mode and applied in a front projection situation.

Referring to FIGS. 2A, 2B, 2C, FIG. 2A is a schematic view of the present invention operating in the first mode and applied in a rear projection situation. When the bi-stable projection screen in the figure operates in the first mode, the bi-stable display unit 20 is controlled at a stable state that allows the passage of an incident light. The projection light 90 is projected from a projector mainframe 99, emitted after passing through the bi-stable display unit 20, diffused by the light diffusion unit 10, and then enters into eyes of a viewer 97. In such a way, the viewer 97 may enjoy the projected image.

Referring to FIG. 2B, it is a schematic view of the bi-stable projection screen of the present invention operating in the second mode. It can be seen from the figure that the bi-stable projection screen presents a picture. In such a way, it can be integrated with a design of the entire environment. The embodiment of the present invention operating in the second mode is represented by, but not limited to, the above picture. Users may design the display pattern of the second mode at will, thereby improving the harmony between the display pattern and the environmental scene.

Referring to FIG. 2C, the structure using the bi-stable projection screen is different from the structure of the bi-stable projection screen of FIG. 2A. FIG. 2C is a schematic view of the embodiment operating in the first mode and applied in a front projection situation. When the bi-stable projection screen in the figure operates in the first mode, the aforementioned bi-stable display unit 20 operates in a reflection stable state, i.e., modulates the incident light to be emitted in a reflection manner. At this point, the projection light 90 is projected from the projector mainframe 99, passes through the light diffusion unit 10, and then enters the bi-stable display unit 20. At this time, the projection light 90 undergoes a first diffusion by the light diffusion unit 10. After entering the bi-stable display unit 20, the transmitted projection light 90 is reflected and emitted by the bi-stable display unit 20, passes through the light diffusion unit 10, emitted after a second diffusion, and then enters the eyes of the viewer 97. In such a way, the viewer 97 can enjoy the projected image. Such an implementation (FIG. 2C) differs from FIG. 2A in terms of the structure of the bi-stable display unit 20 and the travel path of the projection light 90. In FIG. 2C, the projection light 90 enters the bi-stable display unit 20 after passing through the light diffusion unit 10. In FIG. 2A, the projection light 90 directly enters the bi-stable display unit 20.

Both the bi-stable projection screens of FIGS. 2A and 2C, when serving as a projection screen, operate in the first mode, but have different manners for regulating the projection light 90. In FIG. 2A, the projection light 90 is emitted after a transmission, but in FIG. 2C, the projection light 90 is emitted after a reflection. The two are different both in structure and in function. In existing technologies, a part of the bi-stable display units 20 may be modulated in two modes of reflection and non-reflection. A part of the bi-stable display units 20 may operate in two modes of transmission and non-transmission. A part of the bi-stable display units 20 may operate in three modes of transmission, partial transmission, and reflection. The details will be described in detail later.

The aforementioned projection light 90 may be any projection light 90 projected by a projector mainframe, such as a front projector or a rear projector. The front projector is mostly applied in the conference, cinema situations, while the rear projector is mostly applied in large-sized rear projection TVs.

Figure 3:
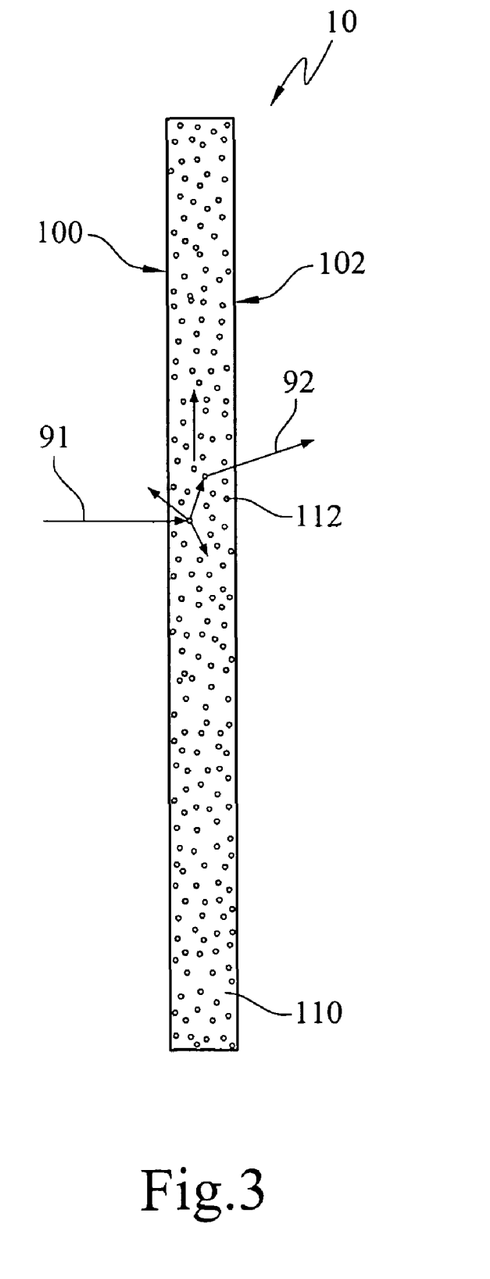
FIG. 3 is a schematic view of a light diffusion unit according to a first embodiment of the present invention.

The aforementioned light diffusion unit 10 is a transmissive light diffusion unit 10. FIG. 3 shows the light diffusion unit 10 of a first embodiment, which is a transmissive bulk light diffuser. The bulk light diffuser is constituted by a body 110 and a plurality of particles 112 disposed in the body 110. A light refractive index of the body 110 is different from that of the particles 112. Therefore, after the light diffusion unit 10 receives a light 91 with its light incident surface 100, the light 91 may enter the body 110, and then contact the particles 112. Since the refractive indices of the particles 112 and the body 110 are different, a refraction is produced to change the travel path of the light 91. The particles 112 are scattered in the body 110. Thus, when the light 91 is emitted from a light exiting surface 102, the light 91 is diffused due to a design of the light diffusion unit 10, so as to form a diffused light 92. When applied in the present invention, the light diffusion unit 10 diffuses the projection light that has passed through the bi-stable display unit 20.

The light diffuser may be a sheet or thin film. A material of the body 110 may be, but not limited to, poly(methylmethacrylate) (PMMA), polycarbonate (PC), methacrylate-co-styrene copolymer (MS), polystyrene (PS), poly(ethylene terephthalate) (PET), cycloolefin polymer (COP), hydrogenated polystyrene, or a mixture of two or more of the above resins, i.e., at least one of a group consisting of the above materials. A material of the particles 112 may be a single type of the above materials for the body, which is, but not limited to, inorganic particles, organic particles, or hybrid particles, or two or more of the above particles. A weight percentage of the body 110 may be 90% to 99.8%, and a weight percentage of the particles may be 0.2% to 10% of light difflusing particles.

Figure 4:
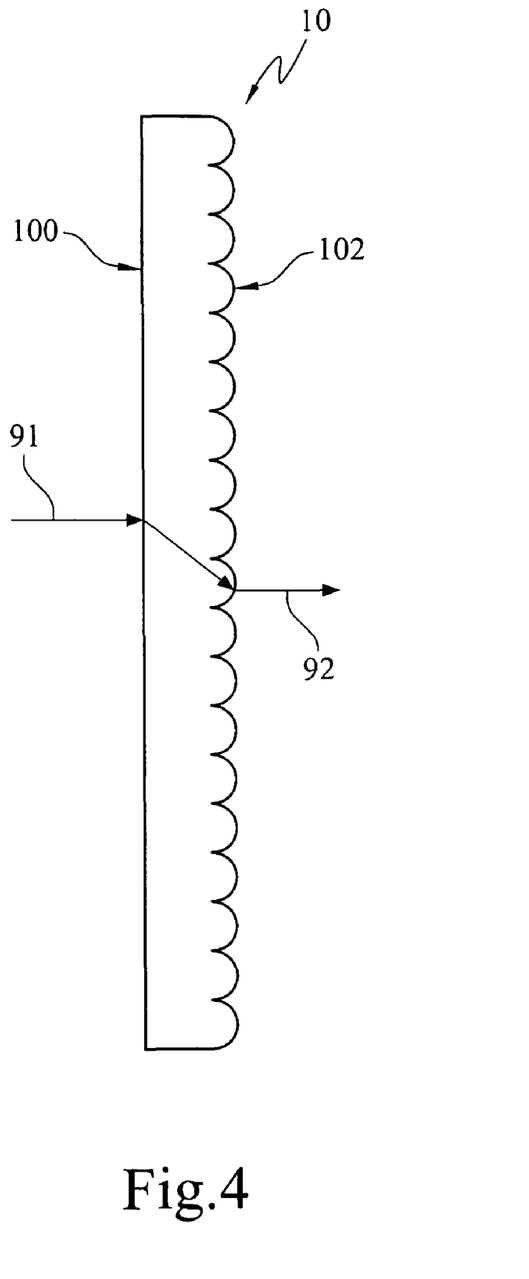
FIG. 4 is a schematic view of the light diffusion unit according to a second embodiment of the present invention.

Next, referring to FIG. 4, the light diffusion unit 10 of a second embodiment is shown. The light diffusion unit 10 is a surface diffuser. The surface diffuser receives the light 91 from the light incident surface 100, and then emits the light from the light exiting surface 102. The light exiting surface 102 is a light diffusion surface, so the light 91 may be diffused after passing through the light diffusion surface so as to form the diffused light 92. It can be seen in this embodiment that the light diffusion surface is a lenticular lens array for diffusing the projection light. The light diffusion surface may also be a ripple structure.

In the light diffusion structure of the second embodiment, the light diffusion surface is fabricated on the light exiting surface 102. However, the light incident surface 100 may also be fabricated as the light diffusion surface in implementation to achieve the same effect. The light diffusion surface may be fabricated on either or both surfaces of the light incident surface 100 and the light exiting surface 102.

Figure 5:
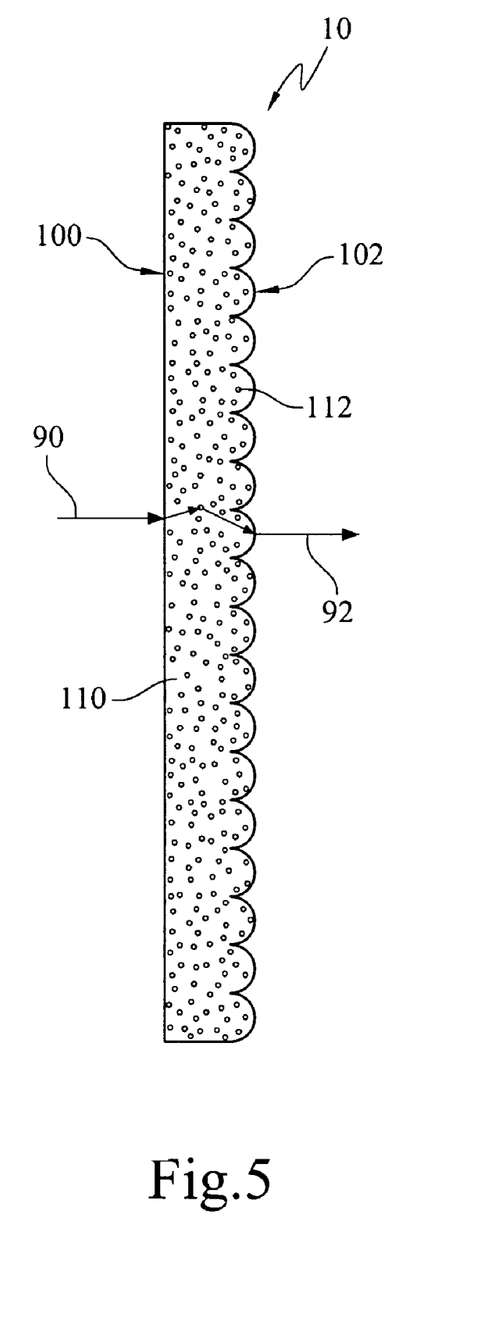
FIG. 5 is a schematic view of the light diffusion unit according to a third embodiment of the present invention.

FIG. 5 shows the light diffusion unit 10 of a third embodiment. The third embodiment is a combination of the first embodiment and the second embodiment. It can be seen from the figure that, the light diffusion unit 10 of the third embodiment is constituted by a body 110 and a plurality of light diffusing particles 112 disposed in the body. The light diffusion unit 10 receives the light 91 with the light incident surface 100, diffuses the light 91 by the use of the light diffusing particles 112 and the light diffusion surface of the light exiting surface, and then emits the diffused light 92 through the light exiting surface 102. Such a combination may combine individual advantages of the first embodiment and the second embodiment, i.e., achieving a refraction effect easily, and also simplifying the process.

Figure 6:
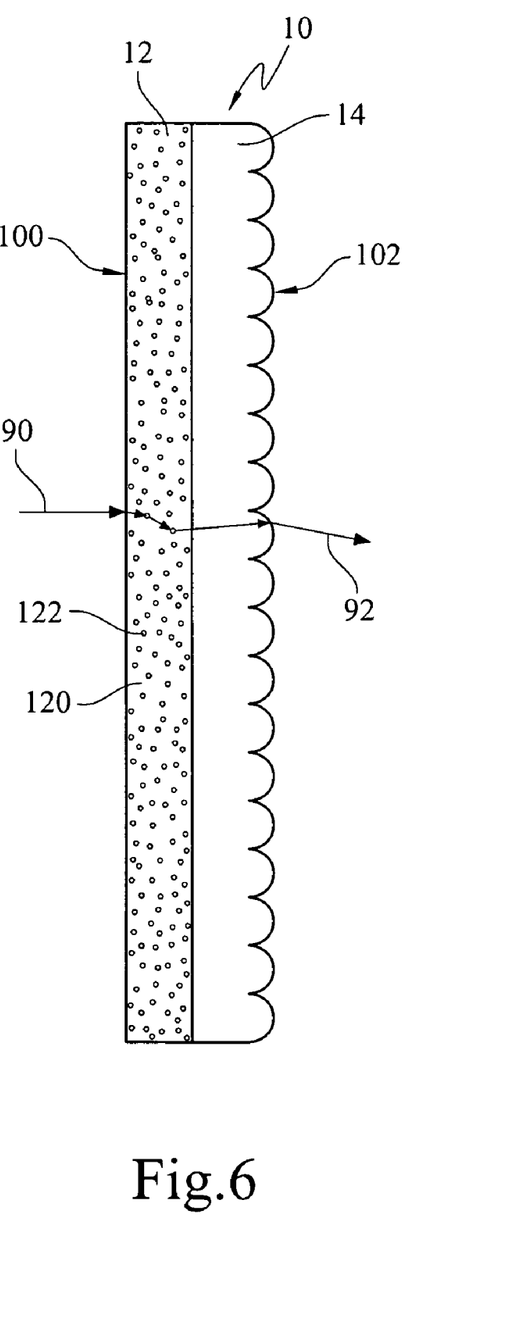
FIG. 6 is a schematic view of the light diffusion unit according to a fourth embodiment of the present invention.

FIG. 6 shows the light diffusion unit 10 of a fourth embodiment. The fourth embodiment is also a combination of the first embodiment and the second embodiment, except that the combination manner differs from that of the third embodiment. It can be seen from the figure that the light diffusion unit 10 of the fourth embodiment includes a first light diffusion structure 12 and a second light diffusion structure 14. The first light diffusion structure 12 and the second light diffusion structure 14 are superposed. The first light diffusion structure 12 is similar to the light diffusion unit 10 of the first embodiment, and a plurality of light diffusing particles 122 is disposed in the body 120. The second light diffusion structure 14 is similar to the light diffusion unit 10 of the second embodiment, and the light exiting surface 102 thereof is provided with a light diffusion surface. Therefore, the light 91 is incident from the light incident surface 100, diffused by the light diffusing particles 122 and the light diffusion surface, and then emitted from the light exiting surface 102.

Figure 7:
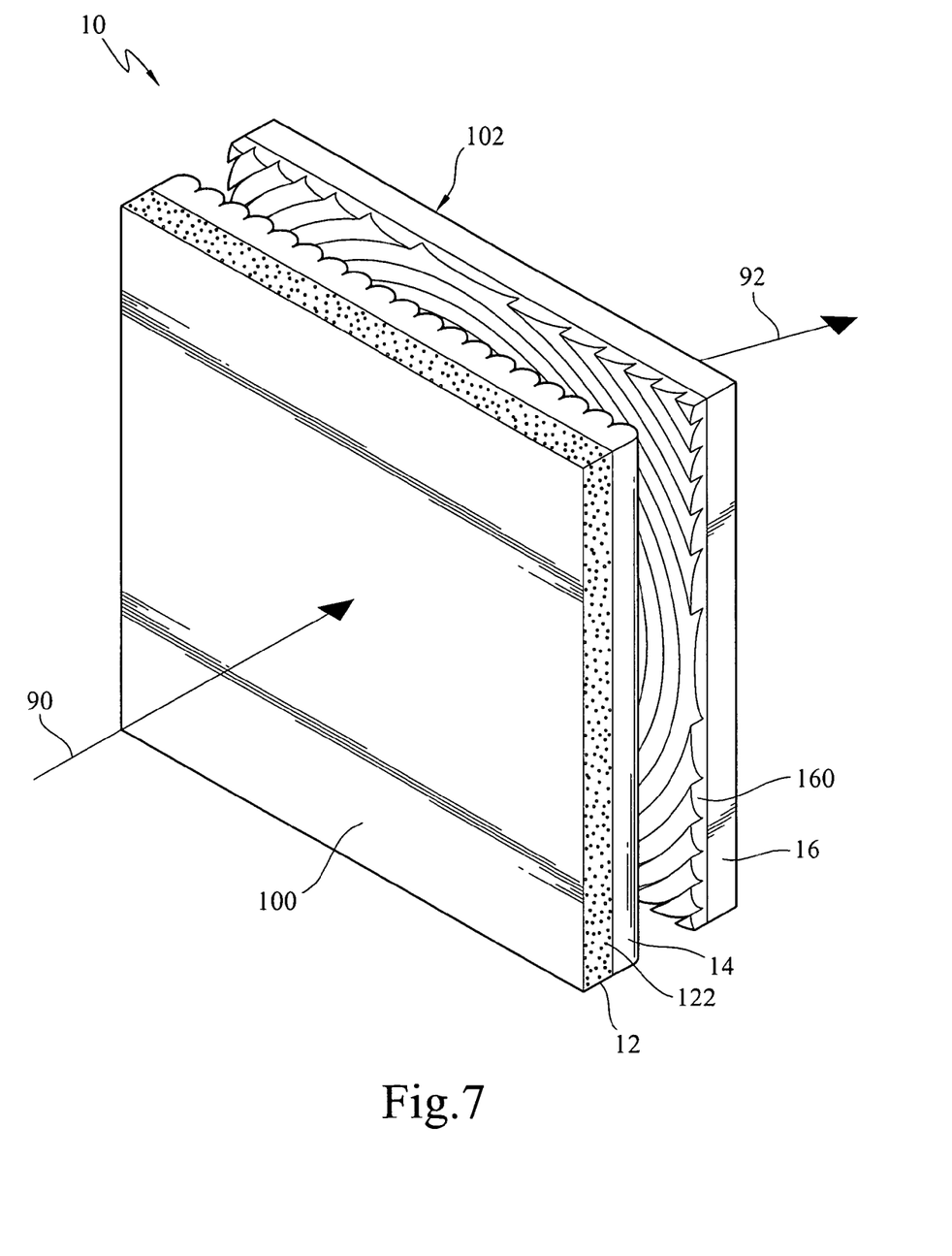
FIG. 7 is a schematic view of the light diffusion unit according to a fifth embodiment of the present invention.

Referring to FIG. 7, the light diffusion unit 10 of a fifth embodiment is shown. The fifth embodiment is an extended embodiment of the light diffusion unit 10 of the fourth embodiment. It can be seen from the figure that the light diffusion unit 10 includes a first light diffusion structure 12, a second light diffusion structure 14, and a third light diffusion structure 16. The first light diffusion structure 12 and the second light diffusion structure 14 are the same as the fourth embodiment, and will not be described herein again. The third light diffusion structure 16 is provided with one Fresnel lens surface 160, such that the light 91 is incident from the light incident surface 100, diffused by the light diffusing particles 122, the light diffusion surface, and the Fresnel lens surface 160, and then emitted from the light exiting surface 102, so as to achieve the effect of diffusing the light 91.

Further, the bi-stable display unit 20 includes three categories, namely transmissive, reflective, and transreflective types. The transmissive bi-stable display unit 20, when actuated, operates between two modes of transmission and non-transmission (absorbing light). When the bi-stable display unit 20 is actuated and operates in the transmission mode (the first mode), the light projected thereon is transmitted through the bi-stable display unit 20, which is similar to the application manner of FIG. 2A.

The reflective bi-stable display unit 20, when actuated, operates between two modes of reflection and non-reflection (absorbing light). When the reflective bi-stable display unit 20 is actuated and operates in the reflection mode (the first mode), the light projected on the reflective bi-stable display unit 20 is reflected. In such a way, when the diffused projection light 90 is irradiated onto the bi-stable display unit 20, the projection light 92 may be emitted after modulation, diffused by the light diffusion unit 10, and then imaged on the human eyes 97, as long as the bi-stable display unit 20 operates in the first mode (the reflection mode if it is reflective, or the transmission mode if it is transmissive).

Moreover, the third bi-stable display unit 20 may operate among three modes of reflection, transmission, and transreflection. In the application of the bi-stable display unit 20, whether the projection screen is used in a front projection or a rear projection is determined at the design stage. Although the third bi-stable display unit 20 functions between two modes, since the third bi-stable display unit 20 has three modes, such bi-stable display unit 20 may be adopted in design, and then adjusted according to the requirement of the front projection or rear projection in the client application. In such a way, the material can be reduced for the manufacturer, and the using flexibility can be increased.

When no projection light is irradiated to the bi-stable display unit 20, the bi-stable display unit 20 may be controlled in the non-reflection or non-transmission mode (i.e., the second mode). Since the bi-stable display unit 20 is constituted by a plurality of pixels (referred to as light valves, which will be described later), each pixel may be controlled properly to operate between the reflection and non-reflection or between the transmission and non-transmission. Therefore, as along as each pixel is controlled properly, that is to say, a part of the pixels operate in the reflection (transmission) state, a part of the pixels operate in the non-reflection (non-transmission) state, and a part of the pixels operate in the partial reflection (transmission) state, the bi-stable display unit 20 may form a predetermined pattern (the second mode), so as to achieve a harmonious design with the surrounding environment. Therefore, the second mode in the present invention is a pattern presented in the vision of the viewers. The pattern may be designed according to the requirement of the users, and is a pattern achieved when each pixel operates in a designated state (stable state).

The projection screen of the transmissive bi-stable display unit 20 is applicable to the rear projection situation such as rear projection TVs, as shown in FIG. 2A. The projection screen of the reflective bi-stable display unit 20 is applicable to the front projection situation such as front projectors, conference rooms, and cinemas, as shown in FIG. 2C.

The bi-stable display unit 20 may be but not limited to a cholesteric liquid crystal display, an electro-wetting display (EWD), an electrophoresis display (EPD), an electro chromic display (ECD), a twisting ball display (TBD), a bi-stable nematic liquid crystal display, a filled nematic liquid crystal display, an electronic ink display, or a macromolecule distributed liquid crystal display.

The transmissive bi-stable display unit 20 may be fabricated into a reflective bi-stable display unit 20 after a proper design (e.g., disposing a white substrate on a side thereof). The details will be described in the following embodiments.

Figure 8A:
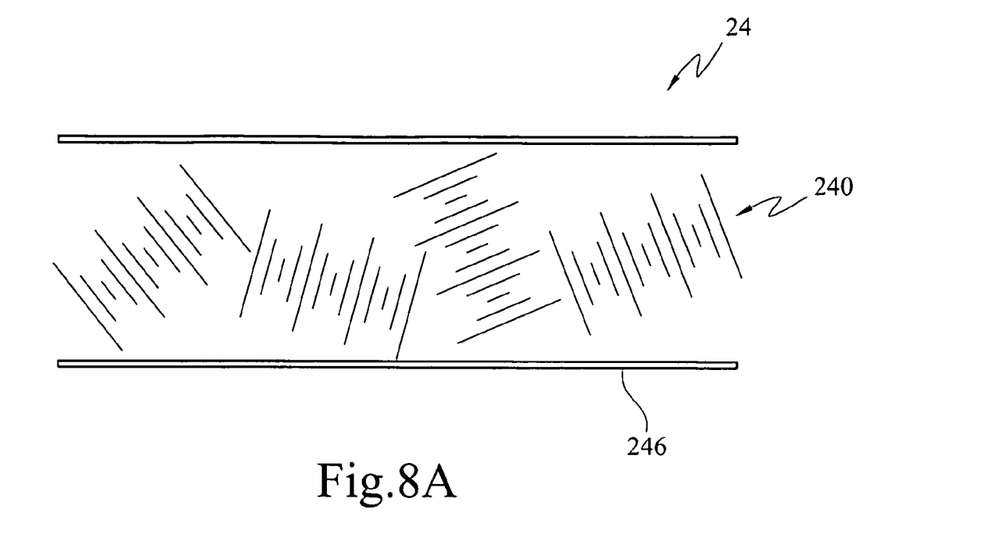
FIGS. 8A and 8B are schematic structural views of liquid crystal molecules of a bi-stable display unit according to the first embodiment of the present invention.
Figure 8B:
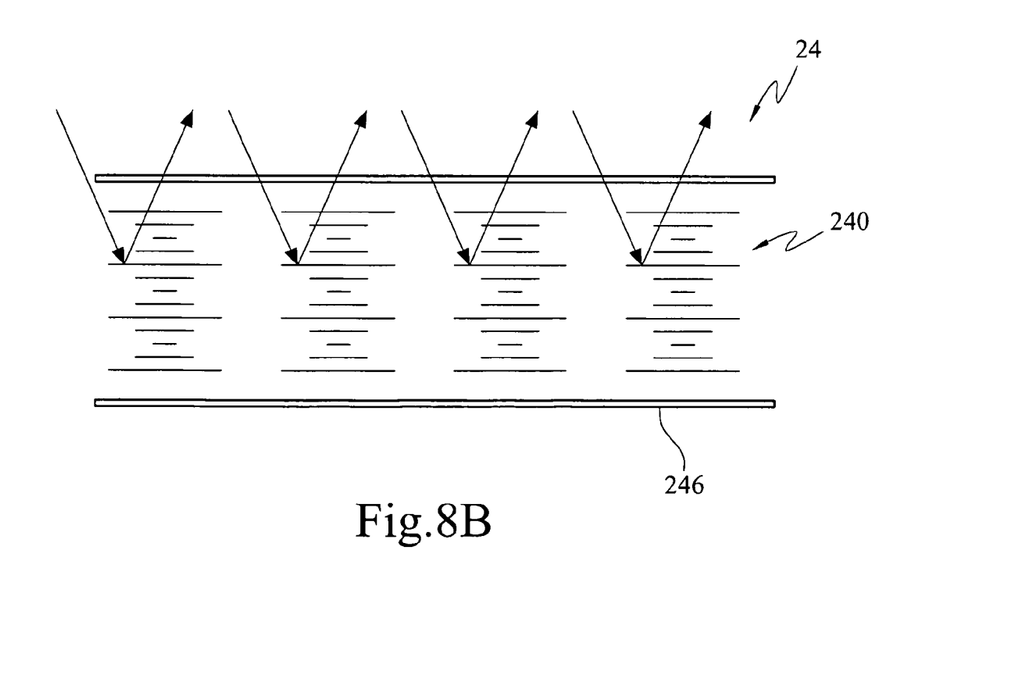
Figure 9:
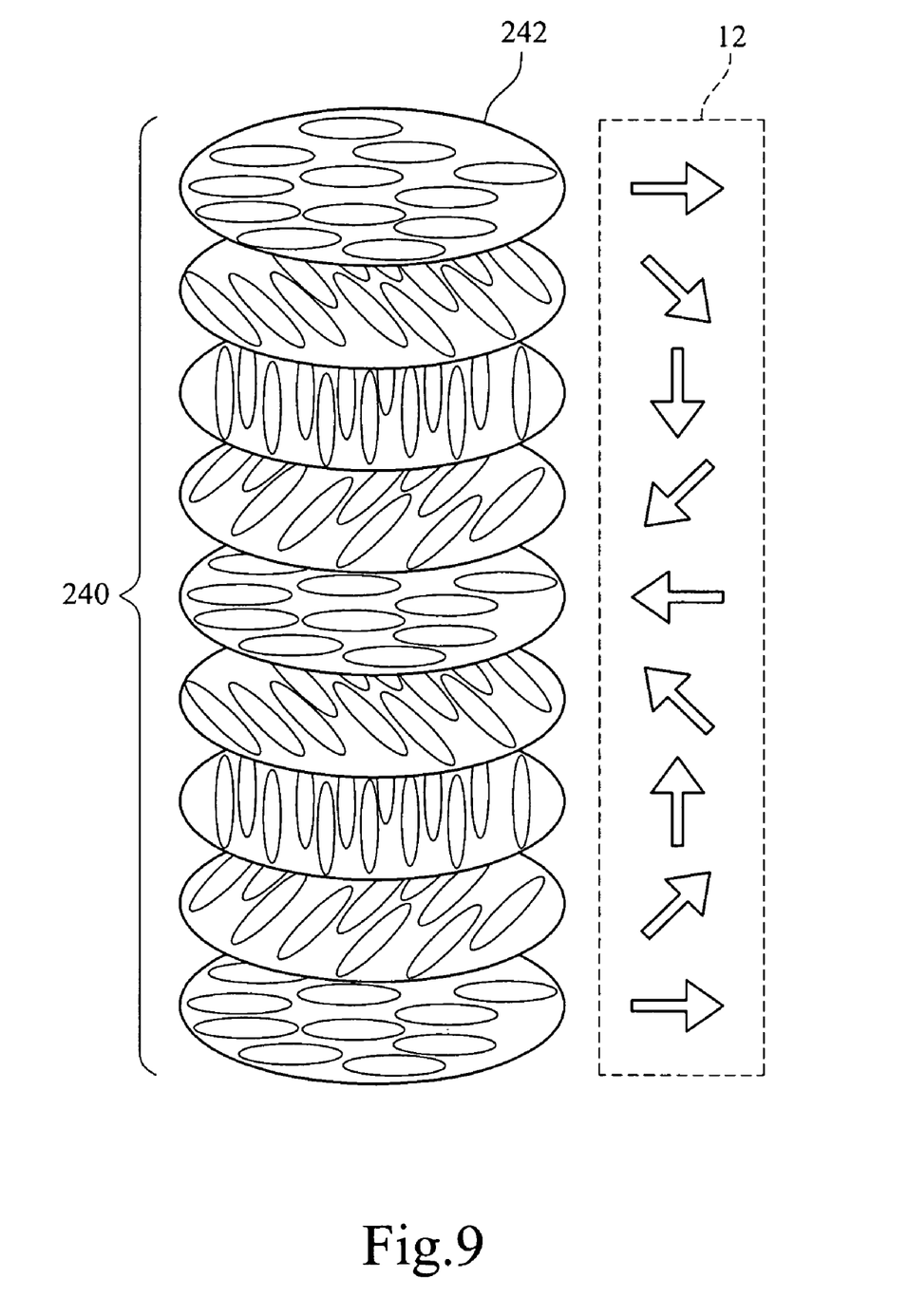
FIG. 9 is a schematic view showing an arrangement of chiral molecules of the bi-stable display unit according to the first embodiment of the present invention.

FIGS. 8A and 8B illustrate the bi-stable display unit 20 according to a first embodiment of the present invention, in which schematic structural views of a liquid crystal molecular layer 24 of a cholesteric liquid crystal display are shown. It can be seen from the figure that the cholesteric liquid crystal display includes a transparent substrate 246a, a light absorbing substrate 246b, and a plurality of multilayer nematic liquid crystals 240 between the two substrates 246a, 246b. The multilayer nematic liquid crystals 240 are formed by assembling and depositing. Each layer of chiral molecules 242 (referring to FIG. 9) is in a helical shape by gradually differing by an angle in a long axis direction, as shown in FIG. 9. Arrows in a box marked by 244 represent the direction of each layer of chiral molecules 242. Taking the bottom layer of chiral molecules 242 for example, if the direction is towards the right side of the picture plane, then the direction of chiral molecules 242 of a second layer counting from the bottom layer is rotated by 45 degrees in a counterclockwise direction (viewed from the top of the picture plane), and so forth. If each layer is rotated by 45 degrees, the direction of a ninth layer is the same as that of the first layer, and this is the so-called helical shape. A thickness from the first layer to the ninth layer is named "pitch." A wavelength of the reflected light may be controlled by adjusting the pitch size.

Referring to FIGS. 8A and 8B again, when no voltage is applied in the bi-stable display unit 20 (a cholesteric liquid crystal display) of the first embodiment, two stable states, namely the planar texture (as shown in FIG. 8B) and the focal-conic texture (as shown in FIG. 8A) exist. Each liquid crystal molecular layer 24 may be selectively converted to the two stable states after actuated. After that, the bi-stable display unit 20 may maintain the converted stable state without electrical power.

Referring to FIG. 8B, the operation manner of the bi-stable display unit 20 of the first embodiment is illustrated. In FIG. 8B, the planar texture is shown. The helical axis of the chiral molecules 242 assumes a distribution with a regular variation. When the light passes through the structure, the chiral molecules 242 may selectively reflect the light of a particular wavelength. The reflected wavelength is related to the pitch of the chiral molecules 242, and the relationship may be applied to reflect the lights of different color wavelengths. For example, the cholesteric liquid crystal molecular layer 24 is properly designed to have three different pitches. The three pitches correspond to particular visible light wavelengths, which are, but not limited to, the blue light of 430-480 nm (nanometer), the green light of 520-570 nm, and the red light of 600-650 nm. The cholesteric liquid crystal molecular layer 24 may selectively reflect the visible light, i.e., may reflect the projection light 90.

Therefore, the bi-stable display unit 20 of the first embodiment, when operating in the stable state (the first mode) as shown in FIG. 8B, becomes the reflective bi-stable display unit 20, and may be used as a projection screen in the front projection application such as the application manner in FIG. 2C after combined with the light diffuser 10 of the present invention.

When the bi-stable display unit 20 of the first embodiment operates in the stable state as shown in FIG. 8A, the projection light 90 may pass through the multilayer nematic liquid crystals, and is absorbed by the light absorbing substrate 246b. This is the non-reflection state. The present invention utilizes the stable state maintained by each multilayer nematic liquid crystals 240 in the bi-stable display unit 20 after actuated so as to form a pattern. That is, when every multilayer nematic liquid crystal 240 is individually actuated to the stable state as shown in FIGS. 8A and 8B, the second mode is assumed. At this time, as along as the stable state of each multilayer nematic liquid crystal 240 is properly designed, under an irradiation of a fall spectrum of the visible light, a part of the multilayer nematic liquid crystals 240 may reflect a particular spectrum, and a part of the multilayer nematic liquid crystals 240 allows the light to pass through and be absorbed by the light absorbing substrate. As such, a pre-designed pattern is presented to become a part of the environmental (interior) design.

Figure 10A:
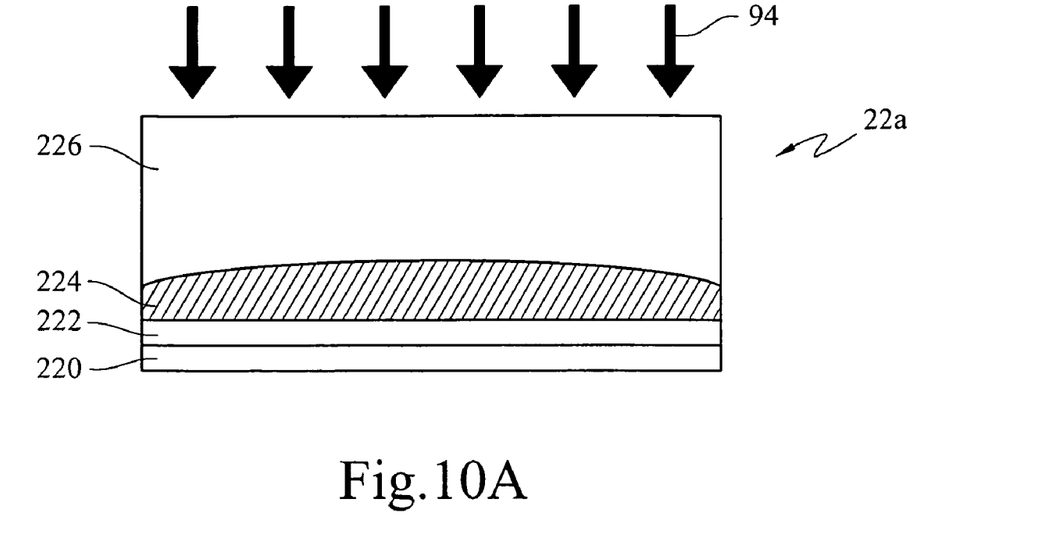
FIGS. 10A and 10B are schematic structural views of a pixel of the bi-stable display unit according to the second embodiment of the present invention.
Figure 10B:
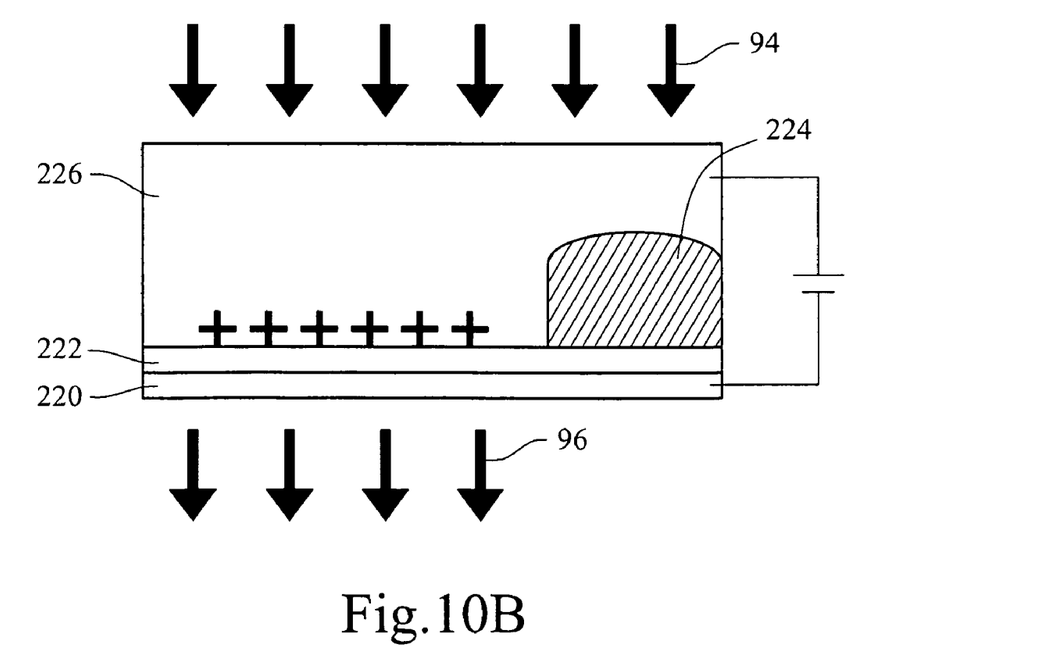

FIGS. 10A and 10B illustrate the bi-stable display unit 20 of a second embodiment of the present invention, in which schematic structural views of a pixel 22a of an electro-wetting display (EWD) are shown. The pixel 22a (also be referred to as light valve) herein is a point representing a single pixel, i.e., the smallest pixel point. A named color pixel point is constituted by a plurality of pixels 22a as disclosed in the present application, and the EWD is constituted by a plurality of pixels 22a in an array arrangement, like the pixel points of an ordinary liquid crystal display. The first embodiment may be seen from the figure that, each pixel 22a includes a transparent electrode 220, an insulator 222 covering the transparent electrode, an aqueous layer 226 covering the insulator 222, and a coloring ink 224 between the aqueous layer 226 and the insulator 222. The insulator 222 is a hydrophobic insulator. A material of the transparent electrode may be a metal oxide such as ITO, $SnO_2$, ZnO or conductive macromolecules. The hydrophobic insulating material is commonly a macromolecule fluorine-containing carbide or silicide. The coloring ink consists of non-polar dyes and non-polar solvents. The non-polar dyes may be anthraquinone, phthalocyanine, and so on, and the non-polar solvent typically utilizes alkanes having 10 to 16 carbon atoms (C10-C16), such as decane ($C_{10}H_{22}$), dodecane ($C_{12}H_{26}$), tetradecane ($C_{14}H_{30}$), hexadecane ($C_{16}H_{34}$), and paraffin oil.

The EWD, when actuated, may or may not be supplied with a voltage. When no voltage is applied between the transparent electrode 220 and the aqueous layer 226, as shown in FIG. 10A (also referred to as the first stable state), the coloring ink 224 will fully cover the transparent electrode, such that the incident light 94 is fully absorbed by the coloring ink 224 (for example, black). If the coloring ink 224 is a green ink, only green incident light 94 is reflected, and incident light 94 with other colors will be absorbed, and so forth. When a particular voltage is applied between the transparent electrode 220 and the aqueous layer 226, the insulator 222 will change from hydrophobic to hydrophilic, such that the coloring ink 224 becomes a beaded shape due to a surface tension, and is stripped from surface of the insulator 222, as shown in FIG. 10B (also referred to as the second stable state). The coloring ink 224 will partially cover the transparent electrode 220, such that the incident light 94 is partially absorbed by the coloring ink 224 (for example, black), and partially transmitted to form a transmitted light 96. At the same time, the extent of the coloring ink 224 covering the transparent electrode 220 may be controlled depending on the magnitude of the applied voltage.

In the application of the second embodiment, when the EWD operates in the first mode, the coloring ink 224 partially covers the insulator 222, such that the projection light 90 is transmitted. When the EWD operates in the second mode, the coloring inks 224 of a part of the pixels fully cover the insulator 222, the coloring inks 224 of a part of the pixels partially cover the insulator 222, so as to form a pattern.

The state of applying a particular voltage is the first mode, such that the bi-stable display unit 20 allows the projection light 90 to pass through. When different voltages are properly applied to each pixel 22a (i.e., the second mode), the bi-stable display unit 20 may form a pattern, which conforms to the requirement of the entire environment design. The first mode is the second stable state of the bi-stable display unit 20, but the second mode is the state that each pixel 22a of the bi-stable display unit 20 individually operates in the first stable state, the second stable state, and a state between the first stable state and the second stable state. That is, a part of the pixels 22a operate in the first stable state, and a part of the pixels 22a operate in the second stable state, so as to form the pattern.

Figure 11A:
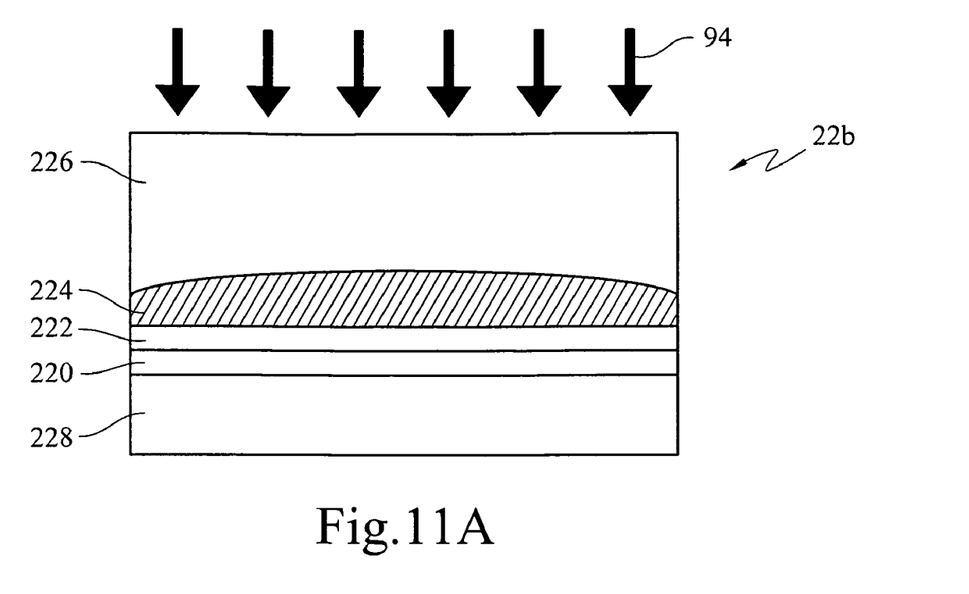
FIGS. 11A and 11B are schematic structural views of a pixel of the bi-stable display unit according to the third embodiment of the present invention.
Figure 11B:
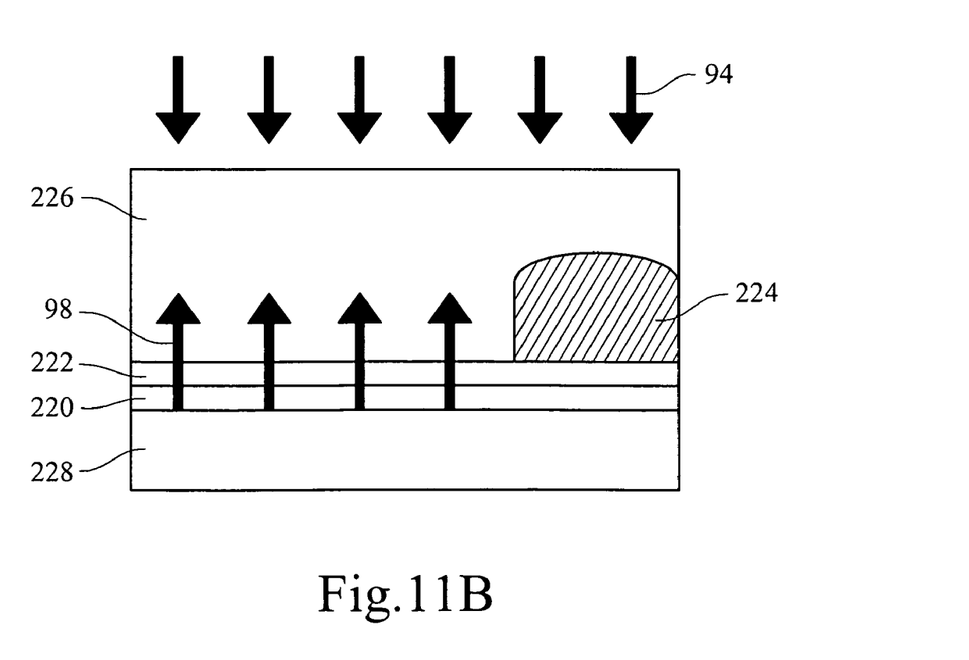

FIGS. 11A and 11B illustrate a bi-stable display unit 20 of third embodiment of the present invention, in which schematic structural views of a pixel 22b of another EWD are shown. Each pixel 22b includes a white substrate 228, a transparent electrode 220 covering the white substrate 228, an insulator 222 covering the transparent electrode, an aqueous layer 226 covering the insulator 222, and a coloring ink 224 between the aqueous layer 226 and the insulator 222. The insulator 222 is a hydrophobic insulator.

The operation principles of the pixels 22a, 22b of the bi-stable display unit 20 of the second embodiment and the third embodiment are same, except that a white substrate 228 is further included below the transparent electrode 220 in the pixel 22b of the third embodiment. Therefore, when a voltage is applied to the pixel 22b (as shown in FIG. 11B), a part of the incident light 94 may be absorbed by the coloring ink 224, and a part of the incident light 94 may be reflected by the white substrate 228, so as to form a reflected light 98. When no voltage is applied to the pixel 22b, the operation manner is the same as that of the pixel 22a of the first embodiment, and will not be described herein again. In the application of the second embodiment, when the EWD operates in the first mode, the coloring ink 224 partially covers the insulator 222 to reflect the projection light 90 by the white substrate 228. When the EWE operates in the second mode, the coloring inks 224 of a part of the pixels fully cover the insulator 222, and the coloring inks 224 of a part of the pixels partially cover the insulator 222, so as to form a pattern.

It can be known from the above description that the bi-stable display unit 20 of the second embodiment is a transmissive bi-stable display unit 20. Although the actuation manner of the bi-stable display unit 20 of the third embodiment is the same as that of the first embodiment, a different effect is achieved. The bi-stable display unit 20 of the second embodiment is a reflective bi-stable display unit 20. Both of them can be used to modulate the projection light 90.

Furthermore, the coloring ink 224 of the EWD may also be added with a reflecting agent, such that the coloring ink 224 may reflect the incident light, and also achieve another display effect.

Figure 12A:
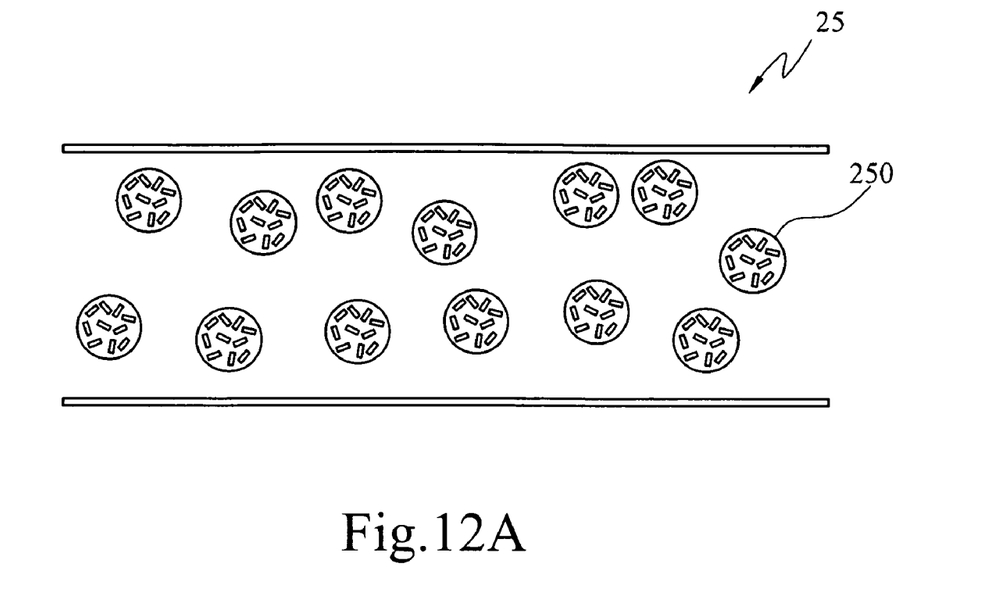
FIG. 12A and 12B are schematic structural views of a micro-cell dispersion layer of the bi-stable display unit according to the fourth embodiment of the present invention.
Figure 12B:
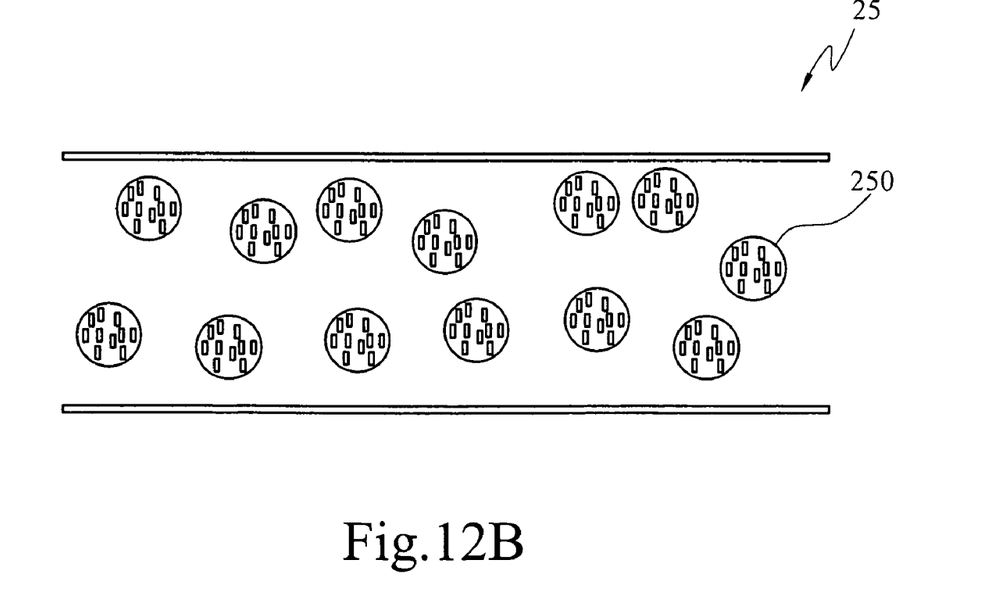
Figure 13:
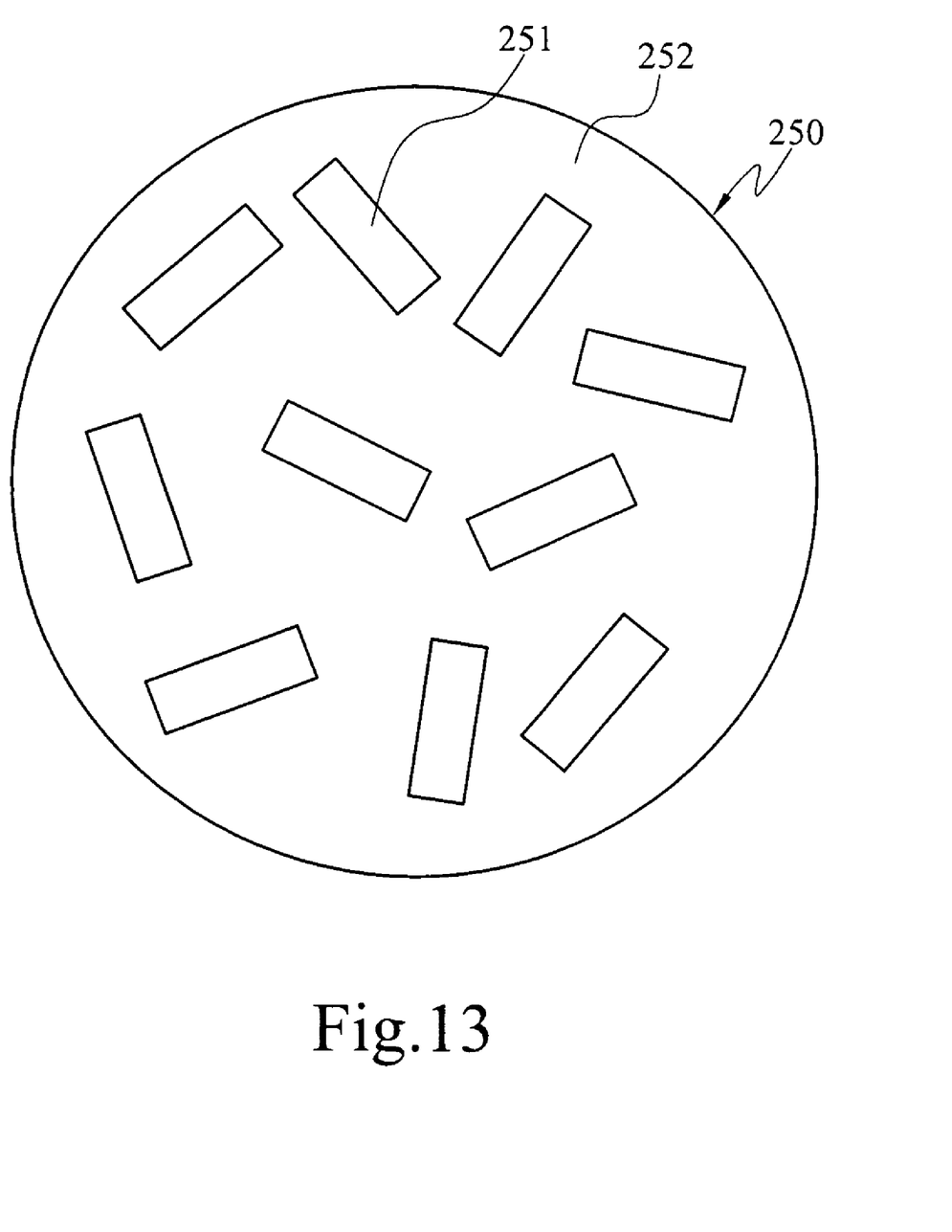
FIG. 13 is a schematic structural view of a micro-cell of the bi-stable display unit according to the fourth embodiment of the present invention.

FIGS. 12A and 12B illustrate the bi-stable display unit 20 of a fourth embodiment of the present invention, in which schematic structural views of two stable states of another cholesteric liquid crystal micro-particle display, namely the stable state of absorbing light (as shown in FIG. 12A) and the stable state of reflecting light (as shown in FIG. 12B) are shown. Referring to FIG. 13 together, it can be seen that a plurality of micro-cells 250 is dispersed in a transparent substrate (e.g., a transparent macromolecule material) to form a micro-cell dispersion layer 25. A long axis of the micro-cell 250 is between 10 μm to 500 μm. The micro-cell 250 mainly consists of cholesteric liquid crystal micro-particles 251 dispersed in the non-reactive transparent liquid 252. The cholesteric liquid crystal micro-particles 251 are polymerized by reactive cholesteric liquid crystal molecules, and may have any shape, and the length of the long axis is between 1 μm to 100 μm. An arrangement of the cholesteric liquid crystal molecules within such cholesteric liquid crystal micro-particles 251 has three pitches corresponding to the visible light wavelengths, which are, for example, but not limited to, the blue light of 430-480 nm (nanometer), the green light of 520-570 nm, and the red light of 600-650 nm. The cholesteric liquid crystal molecule may selectively reflect the visible light, i.e., may reflect the projection light 90. The transparent liquid 252 may be, but not limited to, silicone oil (Gelest DMS-T05) or propylene carbonate (Aldrich, 99.7%).

Referring to FIGS. 12A and 12B again, the cholesteric liquid crystal micro-particles 251 may operate between the stable state of absorbing light in FIG. 12A and the stable state of reflecting light in FIG. 12B. In the front projection design, the first mode of the present invention is shown in FIG. 12B. The directions of the long axes of the micro-particles 251 are not consistent. In this state, the projection light may be reflected by the bi-stable display unit 20 after passing through the light diffusion unit 10, then scattered out by the light diffusion unit 10, and enter into the eyes of the viewers, for example, the application manner as shown in FIG. 2C.

When the micro-cells 20 are actuated in FIG. 12A, the projection light is absorbed, i.e. similar to the non-reflection state. Therefore, when a part of the micro-cells 20 in the whole bi-stable display unit 20 operate in the stable state as shown in FIG. 12A, and a part of the micro-cells 20 operate in a stable state as shown in FIG. 12B, a pattern can be formed together with a proper design, and thus the second mode of the present invention is achieved.

Finally, the light absorbing substrate 246b of the bi-stable display unit 20 of the first embodiment of the present invention may also be replaced by a transparent substrate 246a. In such a way, the multilayer nematic liquid crystals 240 of the bi-stable display unit 20 may operates in two modes of reflection and transmission, and can be adjusted depending on the application aspect. That is, it is made to reflect when applied in the front projection situation, and it is made to transmit when applied in the rear projection situation. As such, it is more flexible on the design.

Other implementation aspects of the bi-stable display unit 20 (such as, electrophoresis display (EPD)) can be combined with the light diffusion unit 10 depending on each implementation aspect, thereby achieving the effect of the present invention.

What is claimed is:

1. A bi-stable projection screen, at least comprising:
a bi-stable display unit, selectively operating in a first mode or a second mode when actuated, wherein when operating in the first mode, the bi-stable display unit receives a projection light and emits the projection light after modulation, when operating in the second mode, the bi-stable display unit is a pattern, and the display unit maintains the first mode or the second mode without electrical power; and
a light diffusion unit, receiving and diffusing the modulated projection light and then emitting it.

2. The bi-stable projection screen according to claim 1, wherein the light diffusion unit is a bulk light diffuser, the bulk light diffuser comprises a body and a plurality of particles disposed in the body, and a light refractive index of the body is different from that of the particles.

3. The bi-stable projection screen according to claim 2, wherein a material of the body and the particles is at least one selected from a group consisting of poly(methylmethacrylate) (PMMA), polycarbonate (PC), methacrylate-co-styrene copolymer (MS), polystyrene (PS), poly(ethylene terephthalate) (PET), cycloolefin polymer (COP), or hydrogenated polystyrene.

4. The bi-stable projection screen according to claim 2, wherein the light diffusion unit comprises at least one light diffusion surface to diffuse the modulated projection light.

5. The bi-stable projection screen according to claim 1, wherein the light diffusion unit is a surface diffuser comprising at least one light diffusion surface to diffuse the modulated projection light.

6. The bi-stable projection screen according to claim 5, wherein the light diffusion surface comprises a lenticular lens array.

7. The bi-stable projection screen according to claim 1, wherein the projection light is modulated by the bi-stable display unit after passing through the light diffusion unit, and when the bi-stable display unit operates in the first mode, the projection light that has passed through the light diffusion unit is reflected and enters the light diffusion unit again.

8. The bi-stable projection screen according to claim 7, wherein the bi-stable display unit is a cholesteric liquid crystal display comprising a transparent substrate, an light absorbing substrate, and a plurality of multilayer nematic liquid crystals between the two substrates, in which when the cholesteric liquid crystal display is actuated to the first mode, the multilayer nematic liquid crystals operate in a stable state of a planar texture, and when the cholesteric liquid crystal display is actuated to the second mode, part of the multilayer nematic liquid crystals operate in a stable state of a planar texture, and part of the multilayer nematic liquid crystals operate in a stable state of a focal-conic texture, so as to form the pattern.

9. The bi-stable projection screen according to claim 7, wherein the bi-stable display unit is a cholesteric liquid crystal display comprising a transparent substrate and a plurality of micro-cells dispersed in the transparent substrate, and each of the micro-cells comprises a transparent liquid and a plurality of cholesteric liquid crystal micro-particles disposed in the transparent liquid, in which when the cholesteric liquid crystal display is actuated to the first mode, the micro-cells operate in a stable state of reflecting light, and when the cholesteric liquid crystal display is actuated to the second mode, part of the micro-cells operate in a stable state of reflecting light, and part of the micro-cells operate in a stable state of absorbing light, so as to form the pattern.

10. The bi-stable projection screen according to claim 1, wherein when the bi-stable display unit operates in the first mode, the projection light passes through the bi-stable display unit.

* * * * *